(12) United States Patent
Shibasaki et al.

(10) Patent No.: US 8,794,765 B2
(45) Date of Patent: Aug. 5, 2014

(54) PROJECTION APPARATUS, PROJECTION METHOD, AND MEDIUM STORING PROGRAM

(75) Inventors: Mamoru Shibasaki, Tachikawa (JP); Hiroki Masuda, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 144 days.

(21) Appl. No.: 13/431,462

(22) Filed: Mar. 27, 2012

(65) Prior Publication Data
US 2012/0249976 A1 Oct. 4, 2012

(30) Foreign Application Priority Data

Mar. 28, 2011 (JP) .................................. 2011-070007
Mar. 8, 2012 (JP) .................................. 2012-051992

(51) Int. Cl.
*G03B 21/00* (2006.01)

(52) U.S. Cl.
USPC ................... 353/31; 353/30; 353/85; 353/94; 353/99; 353/52; 362/276; 362/295

(58) Field of Classification Search
USPC .......... 353/30, 31, 52, 85, 94, 9, 99; 315/312, 315/316, 292, 295, 360, 362; 349/5, 7–9; 348/743–747
See application file for complete search history.

(56) References Cited

U.S. PATENT DOCUMENTS

| | | | |
|---|---|---|---|
| 6,801,365 B2 | 10/2004 | Nakamura et al. | |
| 7,052,138 B2 | 5/2006 | Matsui | |
| 7,436,386 B2 | 10/2008 | Ishiguchi | |
| 7,453,609 B2 * | 11/2008 | Itagaki | 358/518 |
| 7,524,067 B2 * | 4/2009 | Sato | 353/42 |
| 7,857,466 B2 | 12/2010 | Inoue et al. | |
| 7,888,623 B2 | 2/2011 | Kawashima et al. | |
| 2004/0227456 A1 | 11/2004 | Matsui | |
| 2005/0094110 A1 | 5/2005 | Nakamura | |
| 2005/0162619 A1 | 7/2005 | Hamaya | |
| 2005/0275809 A1 * | 12/2005 | Ikebe et al. | 353/52 |
| 2006/0170883 A1 | 8/2006 | Matsui | |
| 2009/0059179 A1 * | 3/2009 | Kobori et al. | 353/52 |

(Continued)

FOREIGN PATENT DOCUMENTS

| | | |
|---|---|---|
| JP | 2003-174651 A | 6/2003 |
| JP | 2004-184852 A | 7/2004 |

(Continued)

OTHER PUBLICATIONS

U.S. Appl. No. 12/616,968; First Named Inventor: Mamoru Shibasaki; Title: "Projection Apparatus, Projection Method, and Program for Adjusting Chromaticity"; filed Nov. 12, 2009.

(Continued)

*Primary Examiner* — Sultan Chowdhury
(74) *Attorney, Agent, or Firm* — Holtz Holtz Goodman & Chick PC (57) ABSTRACT

A projection unit projects the optical image formed by the optical image formation unit toward a projection target. A temperature detection unit detects a temperature of each type of the semiconductor light emitting elements during light emission. A measurement unit measures an intensity of light from each type of the semiconductor light emitting elements during light emission. A light emission control unit (a) corrects a measurement result from the measurement unit using a detection result from the temperature detection unit and (b) controls the light emission intensity for each of the semiconductor light emitting elements based on the corrected measurement result.

7 Claims, 8 Drawing Sheets

(56) References Cited

U.S. PATENT DOCUMENTS

| | | | |
|---|---|---|---|
| 2009/0091710 A1* | 4/2009 | Huebner | 353/28 |
| 2009/0109409 A1 | 4/2009 | Haraguchi et al. | |
| 2009/0128451 A1 | 5/2009 | Tokui | |
| 2010/0128226 A1 | 5/2010 | Shibasaki | |
| 2010/0302515 A1* | 12/2010 | Plut | 353/85 |

FOREIGN PATENT DOCUMENTS

| | | |
|---|---|---|
| JP | 2004-198320 A | 7/2004 |
| JP | 2004-317558 A | 11/2004 |
| JP | 2004-341206 A | 12/2004 |
| JP | 2005-208231 A | 8/2005 |
| JP | 2006-330177 A | 12/2006 |
| JP | 2007-65012 A | 3/2007 |
| JP | 2008-79113 A | 4/2008 |
| JP | 2008-116914 A | 5/2008 |
| JP | 2008-177049 A | 7/2008 |
| JP | 2008-192421 A | 8/2008 |
| JP | 2009-122651 A | 6/2009 |
| JP | 2009-192772 A | 8/2009 |
| JP | 2010-152326 A | 7/2010 |
| WO | WO 2007/023681 A | 3/2007 |

OTHER PUBLICATIONS

Japanese Office Action (and English translation thereof) issued on May 7, 2013, in counterpart Japanese Application No. 2012-051992.

* cited by examiner

R CORRECTED VALUE Ar TABLE

| ThR (°C) \ Yr (lm) | 100 | 200 | 300 | 400 |
|---|---|---|---|---|
| 20 | 10 | 20 | 30 | 40 |
| 30 | 9.5 | 19 | 28.5 | 38 |
| ⋮ | ⋮ | ⋮ | ⋮ | ⋮ |
| 100 | 6 | 12 | 18 | 24 |

ThR: DETECTION RESULT FROM TEMPERATURE SENSOR 30
Yr: RED MEASUREMENT RESULT FROM ILLUMINANCE SENSOR 28

G CORRECTED VALUE Ag TABLE

| ThG (°C) \ Yg (lm) | 100 | 200 | 300 | 400 |
|---|---|---|---|---|
| 20 | 10 | 20 | 30 | 40 |
| 30 | 9.5 | 19 | 28.5 | 38 |
| ⋮ | ⋮ | ⋮ | ⋮ | ⋮ |
| 100 | 6 | 12 | 18 | 24 |

ThG: DETECTION RESULT FROM TEMPERATURE SENSOR 29
Yg: GREEN MEASUREMENT RESULT FROM ILLUMINANCE SENSOR 28

B CORRECTED VALUE Ab TABLE

| ThB (°C) \ Yb (lm) | 100 | 200 | 300 | 400 |
|---|---|---|---|---|
| 20 | 10 | 20 | 30 | 40 |
| 30 | 9.5 | 19 | 28.5 | 38 |
| ⋮ | ⋮ | ⋮ | ⋮ | ⋮ |
| 100 | 6 | 12 | 18 | 24 |

ThB: DETECTION RESULT FROM TEMPERATURE SENSOR 31
Yb: BLUE MEASUREMENT RESULT FROM ILLUMINANCE SENSOR 28

FIG.8

R CORRECTED CURRENT ir' TABLE

| Ar-Ab / Ar-Ag | < 0 | 0.5 | 1 | 1.5 | ... | 34 |
|---|---|---|---|---|---|---|
| < 0 | 10 [A] | 9.9 | 9.8 | 9.6 | ... | 3.2 |
| 0.5 | 9.9 | 9.9 | 9.8 | 9.6 | ... | 3.2 |
| 1 | 9.8 | 9.8 | 9.8 | 9.6 | ... | 3.2 |
| 1.5 | 9.6 | 9.6 | 9.6 | 9.6 | ... | 3.2 |
| ⋮ | ⋮ | ⋮ | ⋮ | ⋮ | ⋱ | ⋮ |
| 34 | 3.2 | 3.2 | 3.2 | 3.2 | ... | 3.2 |

PROJECTION APPARATUS, PROJECTION METHOD, AND MEDIUM STORING PROGRAM

CROSS-REFERENCE TO RELATED APPLICATIONS

This application is based upon and claims the benefit of priority under 35 USC 119 of Japanese Patent Applications No. 2011-070007 filed on Mar. 28, 2011; and No. 2012-051992 filed on Mar. 8, 2012; the entire disclosures of both of which, including the description, claims, drawings, and abstract, are incorporated herein by reference in their entirety.

BACKGROUND OF THE INVENTION

1. Field of the Invention

The present invention relates to a projection apparatus, a projection method, and a storage medium storing a program, suitable for a Digital Light Processing (DLP) (a registered trademark) projector apparatus, for example.

2. Description of the Related Art

Various projectors have been designed and commercialized which project color images in a field sequential manner by transmitting white light from a light source through a color wheel with a plurality of color filters for the respective colors arranged on a peripheral surface thereof to obtain colored light in a time division manner and using the light to project images for the respective colors.

As light source elements for such a projector, semiconductor light emitting elements such as light emitting diodes (LEDs) or laser diodes (LDs), which are excellent in power consumption, size, and the quantity of heat, have been expected to replace discharge lamps such as high-pressure mercury lamps which have been frequently used.

If these semiconductor light emitting elements are used as light sources for a projector, since each semiconductor light emitting element essentially emits light at a single wavelength, a plurality of semiconductor light emitting elements with different light emission wavelengths need to be combined together for use.

If a plurality of different types of semiconductor light emitting elements with different light emission wavelengths are used, luminance needs to be balanced among the different types of semiconductor light emitting elements. Thus, as in the case of an invention described in Jpn. Pat. Appln. KOKAI Publication No. 2010-152326, a technique has been proposed in which the chromaticity of source light based on a field sequential method is accurately kept consistent with a set content has been proposed.

According to the technique described in Jpn. Pat. Appln. KOKAI Publication No. 2010-152326, the brightness of each color is measured using an illuminance sensor, and based on the results of the measurement, the brightness is adjusted such that an accumulated chromaticity is equal to a target value.

However, the semiconductor light emitting element has its light emission wavelength varied with temperature, while having its sensitivity varied with the wavelength of incident light. Thus, a change in the temperature of any of the semiconductor light emitting elements serving as light sources changes a detected value from the illuminance sensor even with the level of an output from the semiconductor light emitting element unchanged. As a result, the balance among the colors of the projected image is disrupted.

BRIEF SUMMARY OF THE INVENTION

According to one aspect of the present invention, there is provided a projection apparatus comprising: a plurality of different types of semiconductor light emitting elements with different light emission wavelengths; an input unit configured to input an image signal; an optical image formation unit which forms an optical image according to the image signal input by the input unit using source light emitted by the semiconductor light emitting elements; a projection unit which projects the optical image formed by the optical image formation unit toward a projection target; a temperature detection unit which detects a temperature of each type of the semiconductor light emitting elements during light emission; a measurement unit which measures an intensity of light from each type of the semiconductor light emitting elements during light emission; and a light emission control unit configured (a) to correct a measurement result from the measurement unit using a detection result from the temperature detection unit and (b) to control the light emission intensity for each of the semiconductor light emitting elements based on the corrected measurement result.

According to another aspect of the present invention, there is provided a projection method applied to an apparatus including a plurality of different types of semiconductor light emitting elements with different light emission wavelengths, an input unit configured to input an image signal, an optical image formation unit which forms an optical image according to the image signal input by the input unit using source light emitted by the semiconductor light emitting elements, and a projection unit which projects the optical image formed by the optical image formation unit toward a projection target, the method comprising: detecting a temperature of each type of the semiconductor light emitting elements during light emission; measuring an intensity of light from each type of the semiconductor light emitting elements during light emission; and correcting a measurement result in the measurement using a detection result obtained in the temperature detection and controlling the light emission intensity for each of the semiconductor light emitting elements based on the corrected measurement result.

According to still another aspect of the present invention, there is provided a non-transitory computer-readable storage medium having program code stored thereon for controlling an apparatus including a plurality of different types of semiconductor light emitting elements with different light emission wavelengths, an input unit configured to input an image signal, an optical image formation unit which forms an optical image according to the image signal input by the input unit using source light emitted by the semiconductor light emitting elements, and a projection unit which projects the optical image formed by the optical image formation unit toward a projection target, to carry out the function of: detecting a temperature of each type of the semiconductor light emitting elements during light emission; measuring an intensity of light from each type of the semiconductor light emitting elements during light emission; and correcting a measurement result in the measurement using a detection result obtained in the temperature detection and controlling the light emission intensity for each of the semiconductor light emitting elements based on the corrected measurement result.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

In an embodiment, the present invention is applied to a DLP (a registered trademark) data projector apparatus.

Figure 1:
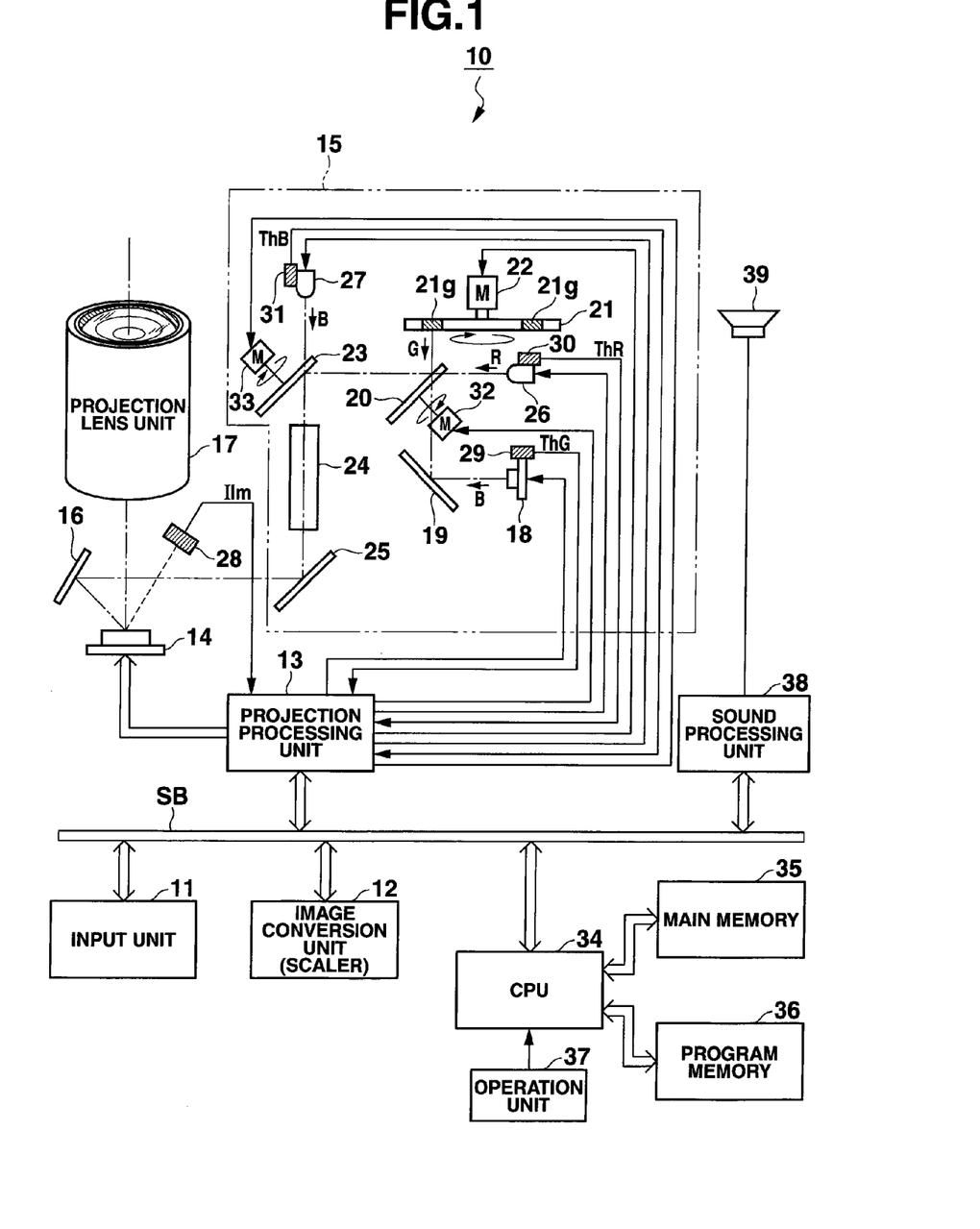
FIG. 1 is a diagram showing a configuration of an electronic circuit and an optical system in a data projector apparatus according to an embodiment of the present invention.

FIG. 1 is a diagram showing a general functional configuration of a data projector apparatus 10 according to the present embodiment.

An input unit 11 includes, for example, a pin jack (RCA) video input terminal and a D-sub15 RGB input terminal. Analog image signal according to any of various standards which has been input to the input unit 11 is digitized in the input unit 11, and the digitalized image signal is transmitted to an image conversion unit 12 via a system bus SB.

The image conversion unit 12 is also referred to as a scaler and converts input image data into the same predetermined format suitable for projection to transmit the converted image data to a projection processing unit 13.

In this case, the image conversion unit 12 further processes the image data as needed by superimposes, on the image data, data such as symbols for On-Screen Display (OSD) which are indicative of various operating conditions. The image conversion unit 12 then transmits the processed image data to the projection processing unit 13.

According to the transmitted image data, the projection processing unit 13 drives a micro mirror element 14 serving as a spatial optical modulation element, performing faster time divisional driving in which a frame rate, for example, 60 [frames/second], the number of color components into which light is split, and a display gradation number are multiplied in accordance with a predetermined format.

The micro mirror element 14 performs a high-speed turn-on/off operation individually on the inclination angles of a plurality of micro mirrors, for example, micro mirrors the number of which corresponds to WXGA (Wide eXtended Graphic Array) (1280 horizontal pixels×800 vertical pixels) to display an image. The resultant reflected light forms an optical image.

On the other hand, a light source unit 15 cyclically outputs light beams in primary colors R, G, and B in a time division manner. The primary light beams from the light source unit 15 are totally reflected by a mirror 16 and delivered to micro mirror element 14.

Then, the reflected light from the micro mirror element 14 forms the optical image. The optical image formed is projected and displayed on a screen (not shown in the drawings), which is a projection target, via a projection lens unit 17.

The light source unit 15 includes LD 18 that emits blue laser light.

The blue laser light (B) emitted by LD 18 is reflected by a mirror 19, passes through a dichroic mirror wheel 20, and is delivered to a peripheral surface of a fluorescent wheel 21. The fluorescent wheel 21 is rotated by a wheel motor (M) 22 and forms a phosphor layer 21g all over the peripheral surface irradiated with the blue laser light.

More specifically, the phosphor layer 21g is formed by coating a phosphor on the circumference of the fluorescent wheel 21 irradiated with the laser light. A reflector is provided on the back of the surface of the fluorescent wheel 21 in which the phosphor layer 21g is formed so that the reflector overlaps the phosphor layer 21g.

When the phosphor layer 21g of the fluorescent wheel 21 is irradiated with blue laser light, green light (G) is excited as reflected light. The green light is reflected by the dichroic mirror wheel 20 and also by a diachronic mirror wheel 23. The reflected light is converted into a luminous flux with an even luminance distribution by an integrator 24. The luminous flux is then reflected by a mirror 25, and reaches the mirror 16.

The light source unit 15 further includes LED 26 that emits red light and LED 27 that emits blue light.

The red light (R) emitted by LED 26 passes through the dichroic mirror wheel 20 and is then reflected by the dichroic mirror wheel 23. The reflected light is converted into a luminous flux with an even luminance distribution by the integrator 24. The luminous flux is then reflected by the mirror 25, and reaches the mirror 16.

The blue light (B) emitted by LED 27 passes through the dichroic mirror wheel 23, and is converted into a luminous flux with an even luminance distribution by the integrator 24. The luminous flux is then reflected by the mirror 25, and reaches the mirror 16.

As described above, the dichroic mirror wheel 20 allows the blue light and the red light to pass through, while reflecting the green light. The dichroic mirror wheel 23 allows the blue light to pass through, while reflecting the green light and the red light.

In the present embodiment, the micro mirror element 14 performs an operation of distributing the reflected light to allow light failing to be reflected toward the projection lens unit 17, that is, what is called "off light" to enter the illuminance sensor 28, serving as a measurement unit. The illuminance sensor 28 measures the illuminance of incident light and outputs, to the above-described projection processing unit 13, a signal Ilm indicative of the result of measurement of the illuminance of light during an R field period, a signal IIlm indicative of the result of measurement of the illuminance of light during a G field period, and a signal IIIlm indicative of the result of measurement of the illuminance of light during a B field period, as described below in detail.

Moreover, LD 18 is provided with a temperature sensor 29 installed away from the light emission direction of LD 18 and serving as a temperature detection unit. Similarly, LD 26 is provided with a temperature sensor 30 installed away from the light emission direction of LD 26, and LD 27 is provided with a temperature sensor 31 installed away from the light emission direction of LED 27.

Under the control of CPU 34 described below, the projection processing unit 13 allows the micro mirror element 14 to display an image to form an optical image, allows LD 18 and LED 26 and 27 to emit light, allows the wheel motor 22 to rotate the fluorescent wheel 21, drives a motor (M) 32 that rotates the dichroic mirror wheel 20, drives a motor (M) 33 that rotates the dichroic mirror wheel 23, allows the illuminance sensor to measures the illuminance, and allows the temperature sensors 29 to 31 to detect temperatures.

CPU 34 controls all the operations of the above-described circuits. CPU 34 is connected directly to a main memory 35 and a program memory 36. The main memory 35 includes, for example, SRAM, and functions as a work memory for CPU 34. The program memory 36 includes an electrically rewritable nonvolatile memory, and stores operation programs that are executed by CPU 34 and various fixed data. CPU 34 uses the main memory 35 and the program memory 36 to perform control operations in the data projector apparatus 10.

CPU 34 performs various projection operations in response to key operation signals from an operation unit 37.

The operation unit 37 includes a key operation unit provided on the main body of the data projector apparatus 10 and an infrared light reception unit that receives infrared light from a remote controller (not shown in the drawings) dedicated to the data projector apparatus 10. The operation unit 37 outputs key operation signals based on keys operated by a user using the key operation unit or the remote controller, directly to CPU 31.

CPU 34 is also connected to a sound processing unit 38 via the system bus SB. The sound processing unit 38 includes a sound source circuit such as a PCM sound source. The sound processing unit 38 converts sound data provided during a projection operation into analog data, and drives a speaker unit 39 to amplify and emit sound or generate a beep or the like as needed.

Now, a specific example of configuration of the optical system including the light source unit 15, the micro mirror element 14, and the projection lens unit 17 will be described with reference to FIG. 2.

Figure 2:
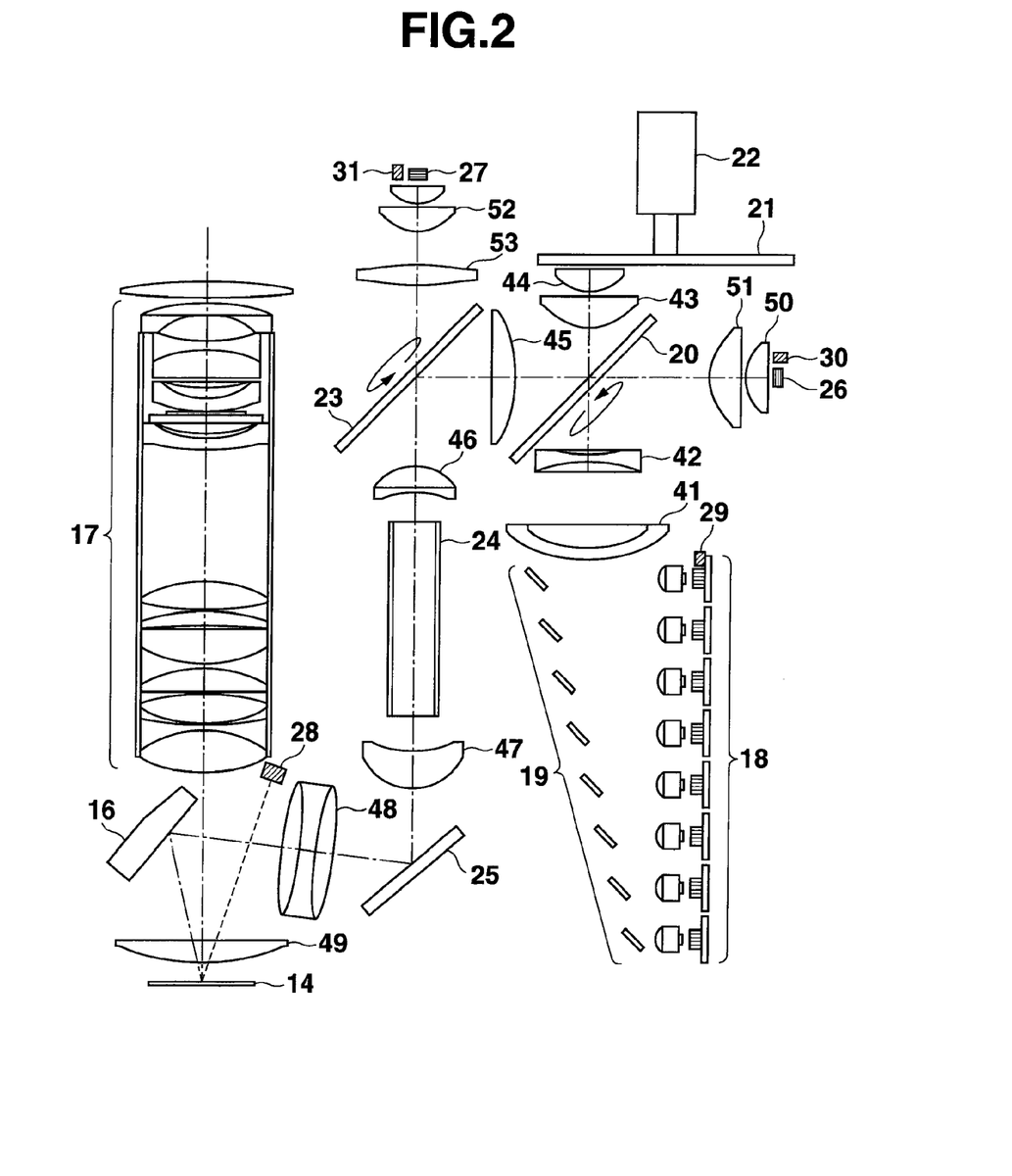
FIG. 2 is a diagram showing a specific example of configuration of the optical system according to the embodiment.

In FIG. 2, LD 18 includes an LD array with a plurality of, for example, 6×4 (the direction of the sheet of the drawing), that is, a total of 24 LDs arranged in a matrix and emit light. The output blue laser light is reflected by a mirror 19 including a stepped array of mirrors arranged in a matrix and which are identical to LDs 18 in number.

The blue laser light reflected by the mirror 19 is projected on the fluorescent wheel 21 via lenses 41 and 42, the dichroic mirror wheel 20, and lenses 43 and 44.

The green light excited by the phosphor layer 21g of the fluorescent wheel 21 is reflected by the reflector provided on the back of the surface of the fluorescent wheel 21 in which the phosphor layer 21g is formed. The reflected green light is further reflected by the dichroic mirror wheel 20 via the lenses 43 and 44, passes through a lens 45, and is reflected by the dichroic mirror wheel 23.

The green light reflected by the dichroic mirror wheel 23 is reflected by the mirror 25 via a lens 46, the integrator 24, and a lens 47, and passes though a lens 48 to the mirror 16.

The green light reflected by the mirror 16 is delivered to the micro mirror element 14 via a lens 49, and the micro mirror element 14 forms an optical image in the corresponding color. The optical image formed is output toward the projection lens unit 17 via the lens 49.

Furthermore, the red light emitted by LED 26 passes through the dichroic mirror wheel 20 via lenses 50 and 51, and is reflected by the dichroic mirror wheel 23 via the lens 45.

The blue light emitted by LED 27 passes through the dichroic mirror wheel 23 via lenses 52 and 53.

Now, the operation of the above-described embodiment will be described.

As described above, all operations described below are performed with relevant operation programs, fixed data, and the like read from the program memory 36 by CPU 34 and expanded and stored in the main memory 35.

For simplification of description, it is assumed that one color image frame is projected by, for example, forming the frame using four fields for R (Red), G (Green), W (White), and B (Blue), respectively, and projecting an image in these colors. In the W (White) field, LD 18 for the green light, LED 26 for the red light, and LED 27 for the blue light are all simultaneously allowed to emit light, with the micro mirror element 14 displaying an image corresponding to a luminance signal Y (Y=0.299R+0.587G+0.114B).

Figure 3:
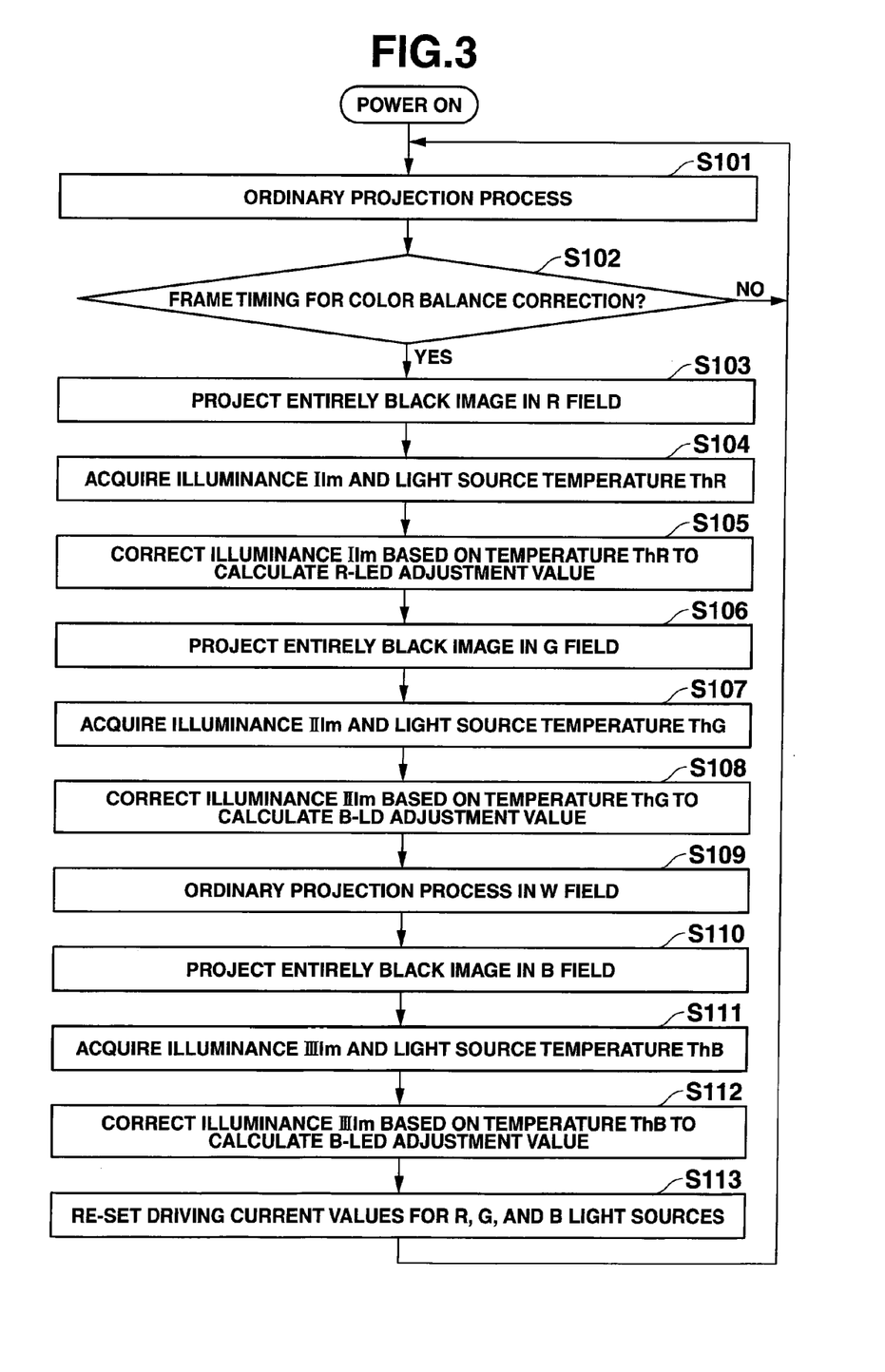
FIG. 3 is a flowchart showing the contents of processing for correcting a color balance among light sources which processing is carried out in conjunction with a projection operation during power-on according to the embodiment.

FIG. 3 is a flowchart illustrating the contents of processing mainly for correcting the color balance among light sources which processing is carried out while the data projector apparatus 10 is powered on.

With the data projector apparatus 10 powered on, CPU 34 carries out processing for an ordinary projection operation in which the micro mirror element 14 forms an optical image according to an image signal input by the input unit 11 and in which light from the light source unit 15 is projected by the projection lens unit 17 (step S101). CPU 34 determines whether or not the next frame timing is intended for correction of the color balance among the light sources (step S102).

If one frame timing for connection of the color balance among the light sources is assumed to be provided for every hour and the frame rate is 60 [frames/second], one frame timing is provided for every 216,000 frames.

If CPU 34 determines that the next frame timing is not intended for correction of the color balance among the light sources, CPU 34 makes the corresponding determination in step S102 and returns to the processing starting in step S101.

Thus, while carrying out processing for an ordinary projection operation by repeating the processing in steps S101 and S102, CPU 34 waits for a frame timing intended for correction of the color balance among the light sources.

When the next frame timing is intended for correction of the color balance among the light sources, CPU 34 makes the corresponding determination in the above-described step S102. CPU 34 then carries out projection by allowing the micro mirror element 14 to display an entirely black image throughout the period of an R field positioned at the head of the subsequent one frame (step S103).

Figure 4:
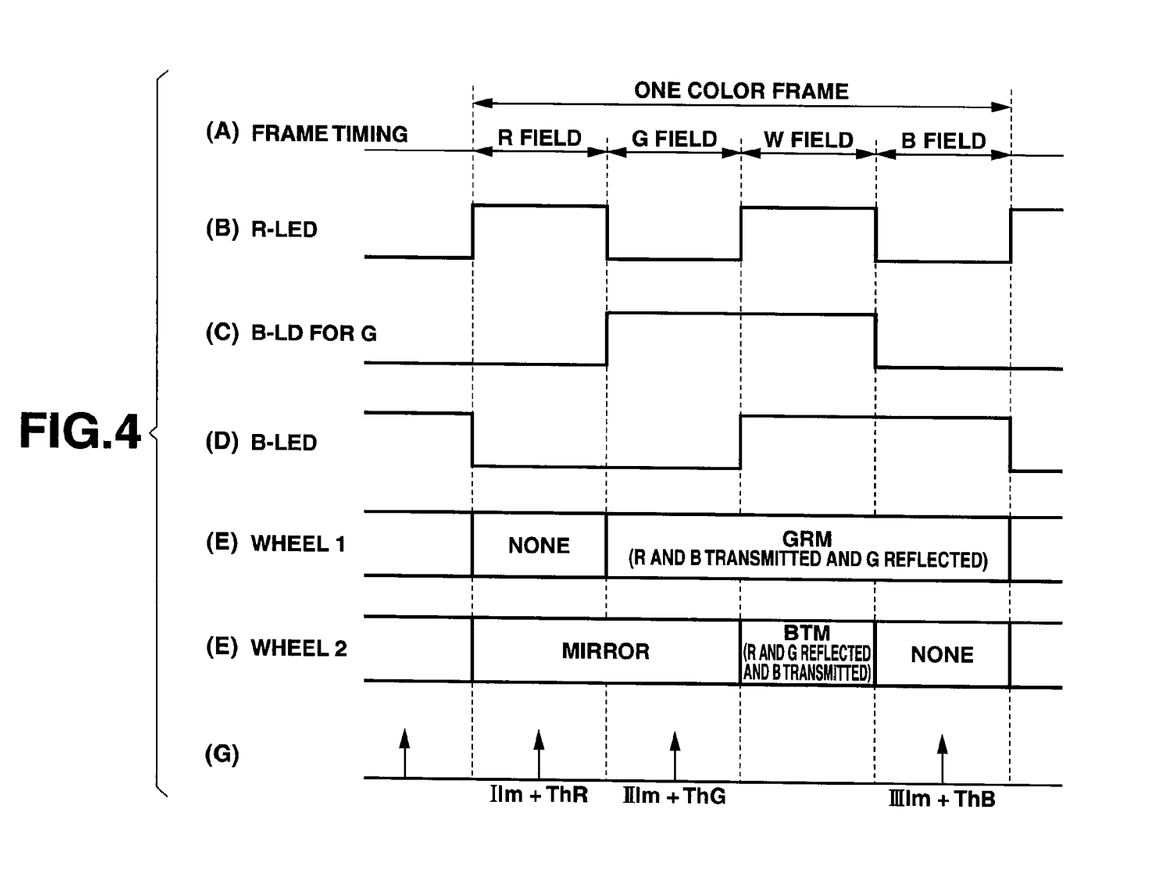
FIG. 4 is a timing chart showing the contents of operation of each unit during the color balance correction according to the embodiment.

FIG. 4 shows operational timings during an image projection period for one frame intended for correction of the color balance among the light sources. As shown in FIG. 4 (A), the one frame includes four fields: an R field, a G field, a W field, and a B field. For easy description, in FIG. 4, the field periods are assumed to have an equal length.

As shown in FIG. 4 (B), LED 26 for red light emission is driven by the projection processing unit 13 so as to emit light during each of the periods of the R field and the W field.

As shown in FIG. 4 (C), LD 18 emitting blue light in order to provide green light is driven by the projection processing unit 13 so as to emit light during each of the periods of the G field and the W field.

As shown in FIG. 4 (D), LED 27 for blue light emission is driven by the projection processing unit 13 so as to emit light during two consecutive periods of the W field and the B field.

In the R field, as shown in FIG. 4 (E), a fan-shaped peripheral surface position of the dichroic mirror wheel 20 irradiated with the red light from LED 26 serves as a transparent member such as plain glass or an acrylic resin, or a cutout to allow the red light from LED 26 to pass through at an efficiency of almost 100[%] and without a loss.

On the other hand, as shown in FIG. 4 (F), a mirror is formed at a peripheral surface position of the dichroic mirror wheel 23 irradiated with the red light from LED 26 to totally reflect the red light from LED 26 having passed through the dichroic mirror wheel 20, at an efficiency of almost 100[%] and without a loss.

As a result of displaying the entirely black image in the above-described step S103, the reflected light from the entire surface of the micro mirror element 14 is projected, as off light, on a light absorption unit (not shown in the drawings) for non-projection with the illuminance sensor 28 located therein, rather than on the projection lens unit 17. A black heat-resistant coating is applied to this unit in order to absorb and convert the off light into heat instead of reflecting the light.

CPU 34 allows the projection processing unit 13 to measure the illuminance Ilm using the illuminance sensor 28 at a timing corresponding to a substantially central position of the R field period, while simultaneously also allowing the projection processing unit 13 to measure the temperature ThR of LED 26 emitting light at this time using the temperature sensor 30 (step S104).

CPU 34 corrects the illuminance Ilm acquired by the illuminance sensor 28 via the projection processing unit 13 based on the temperature ThR of LED 26 detected by the temperature sensor 30 also via the projection processing unit 13 to obtain the accurate illuminance of LED 26. Then, based on the illuminance obtained and the current driving current value, CPU 34 calculates an output adjusted value and specifically a driving current value for LED 26 (step S105).

Figure 5:
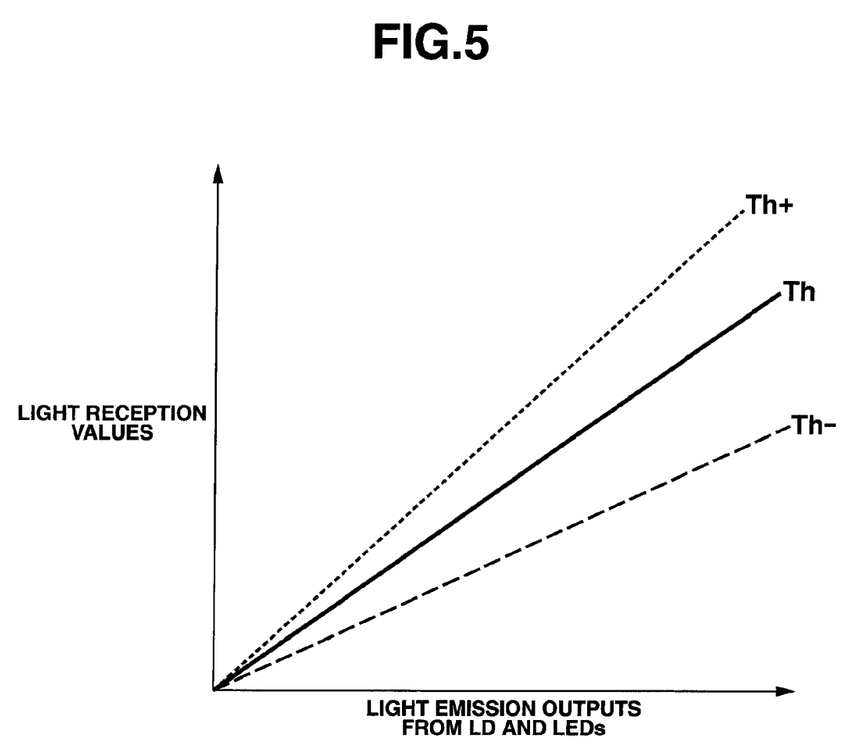
FIG. 5 is a diagram illustrating the relationship between light emission outputs from LD and LEDs and light reception values from an illuminance sensor that receives light emission from LD and LEDs.

FIG. 5 illustrates the relationship between light emission outputs from LD and LEDs and light reception values from the illuminance sensor that receives the light emissions. In FIG. 5, the relevant property exhibited at the temperature Th of each of LD and LEDs is shown by a solid line, the property exhibited at a higher temperature (Th+) is shown by a dotted line, and the property exhibited at a lower temperature (Th−) is shown by a dashed line. In general, an increase in the temperature of the semiconductor light emitting elements results in a shift involving an increase in the light emission wavelength thereof (a decrease in the frequency thereof), and even when the same light emission output delivered to the illuminance sensor by the light surfaces, the sensitivity of the illuminance sensor increases consistently with the wavelength of the light emission output, resulting in measurement results indicative of increased illuminance.

That is, a shift involving the increase in the light emission wavelength thereof due to the increase in the temperature of the semiconductor light emitting elements results in an increase in the differential coefficient, that is, the inclination of a straight line indicative of the relationship between the light emission outputs from LD and LEDs and the light reception values from the illuminance sensor that receives the light emissions.

With this property taken into account, CPU 34 corrects the measurement result from the illuminance sensor 28 based on the detection result ThR from the temperature sensor 30. CPU 34 can thus determine the accurate light emission output from LED 26 and calculate the adjusted value for the light emission output, that is, the correct driving current value.

For example, CPU 34 utilizes the measurement result from the illuminance sensor 28 and the measurement result from the temperature sensor 30 to pre-create arithmetic expression (1) for obtaining a correction value for the illuminance of the semiconductor light emitting element. The arithmetic expression is stored in the program memory.

$$Y'=f(Y,ThR) \qquad (1)$$

where,

Y': corrected value of illuminance of the semiconductor light emitting element

Y: measurement result from the illuminance sensor 28, and

ThR: detection result from the temperature sensor 30

Then, based on the actual detection result ThR from the temperature sensor 30, CPU 34 reads the above-described correction expression stored in the program memory, and corrects the measurement result from the illuminance sensor 28.

Moreover, the program memory pre-stores an arithmetic expression for calculating, from the calculated corrected value of illuminance of the semiconductor light emitting element and the driving current value for the semiconductor light emitting element, the value of a driving current required to allow the semiconductor light emitting element to emit light at the corrected illuminance value.

$$i'=f(A,i) \qquad (2)$$

where, i: value of a driving current being applied to the semiconductor light emitting element i': the value of a driving current required to allow the semiconductor light emitting element to emit light at the corrected illuminance value Then, based on the actual detection result ThR from the temperature sensor 30, CPU 34 measures the driving current value for the semiconductor light emitting element at a measurement timing, and reads the stored expression (2) to correct the driving current value.

Alternatively, for example, CPU 34 may utilize the measurement result from the illuminance sensor 28, the measurement result from the temperature sensor 30, and the value of a driving current being applied to the semiconductor light emitting element to pre-create arithmetic expression (3) for obtaining a coefficient A for use in correcting the illuminance. The arithmetic expression may be stored in the program memory.

$$A=f(Y,ThR,i) \qquad (3)$$

where,

A: coefficient for use in correcting the illuminance

Then, CPU 34 stores, in memory, an arithmetic expression for calculating, from the coefficient A obtained by the above-described expression (3) and the driving current value for the semiconductor light emitting element, the value of a driving current required to allow the semiconductor light emitting element to emit light at the corrected illuminance value.

$$i'=f(A,i) \qquad (4)$$

Then, CPU 34 reads the above-described expression (4) stored during the correction to correct the driving current value.

Thereafter, also in the G field following the R field, CPU 34 carries out projection by allowing the micro mirror element 14 to display an entirely black image throughout the period of the G field (step S106).

In the G field, as shown in FIG. 4 (E), a peripheral position of the dichroic mirror wheel 20 irradiated with the blue light from LD 18 via the mirror 19 includes GRM, that is, a dichroic mirror that allows the red (R) light and the blue (B) light to pass through while reflecting the green (G) light. The blue light from LD 18 passes through the peripheral surface position to the phosphor layer 21g of the fluorescent wheel 21, and green light is excited by the phosphor layer 21g and reflected and output toward the dichroic mirror wheel 23.

On the other hand, as shown in FIG. 4 (F), a mirror is formed at a peripheral surface position of the dichroic mirror wheel 23 irradiated with the green light to totally reflect the green light reflected by the dichroic mirror wheel 20, at an efficiency of almost 100[%] and without a loss.

As a result of displaying the entirely black image in the above-described step S106, the reflected light from the entire surface of the micro mirror element 14 is projected, as off light, on the light absorption unit (not shown in the drawings) for non-projection with the illuminance sensor 28 located therein, rather than on the projection lens unit 17. The black heat-resistant coating is applied to this unit in order to absorb and convert the off light into heat instead of reflecting the light.

CPU 34 allows the projection processing unit 13 to measure the illuminance IIlm using the illuminance sensor 28 at a timing corresponding to a substantially central position of the G field period, while simultaneously also allowing the projection processing unit 13 to measure the temperature ThG of LD 18 emitting light at this time using the temperature sensor 29 (step S107).

CPU 34 corrects the illuminance IIlm acquired by the illuminance sensor 28 via the projection processing unit 13 based on the temperature ThG of LD 18 detected by the temperature sensor 29 also via the projection processing unit 13 to obtain the accurate illuminance of LD 18. Then, based on the illuminance obtained and the current driving current value, CPU 34 calculates an output adjusted value and specifically a driving current value for LD 18 (step S108).

CPU 34 thereafter carries out ordinary projection by allowing all of LD 18, LED 26, and LED 27 to emit light during the W field following the above-described G field so that the micro mirror element 14 displays a luminance image (step S109).

In the W field, as shown in FIG. 4 (E), a peripheral position of the dichroic mirror wheel 20 irradiated with the blue light from LD 18 via the mirror 19 includes GRM, that is, a dichroic mirror that allows the red (R) light and the blue (B) light to pass through while reflecting the green (G) light, as is the case with the preceding G field.

Thus, the blue light from LD 18 passes through the peripheral surface position to the phosphor layer 21g of the fluorescent wheel 21, and green light is excited by the phosphor layer 21g and reflected and output toward the dichroic mirror wheel 23.

At the same time, the red light from LED 26 passes through the dichroic mirror wheel 20 to the dichroic mirror wheel 23.

On the other hand, as shown in FIG. 4 (F), a peripheral position of the dichroic mirror wheel 23 irradiated with the red light and the green light includes BTM, that is, a dichroic mirror that reflects the red (R) light and the green (G) light while allowing the blue (B) light to pass through. Thus, the peripheral surface position reflects the red light from LED 26 and the green light from the phosphor layer 21g, which allowing the blue light from LED 27 to pass through.

Consequently, white light obtained by mixing the red light, the green light, and the blue light together is delivered to the micro mirror element 14, which displays a luminance image. An optical image is then formed at a luminance corresponding to the luminance image and radiated to the projection target by the projection lens unit 17.

Thereafter, in the B field following the above-described W field, CPU 34 carries out projection by allowing the micro mirror element 14 to display an entirely black image again throughout the period of the B field (step S110).

In the B field, only LED 27 is driven to emit light, and as shown in FIG. 4 (F), a peripheral surface position of the dichroic mirror wheel 23 irradiated with the blue light serves as a transparent member such as plain glass or an acrylic resin, or a cutout to allow the blue light from LED 27 to pass through at an efficiency of almost 100[%] and without a loss.

As a result of displaying the entirely black image in the above-described step S110, the reflected light from the entire surface of the micro mirror element 14 is projected, as off light, on the light absorption unit (not shown in the drawings) for non-projection with the illuminance sensor 28 located therein, rather than on the projection lens unit 17. The black heat-resistant coating is applied to this unit in order to absorb and convert the off light into heat instead of reflecting the light.

CPU 34 allows the projection processing unit 13 to measure the illuminance IIIlm using the illuminance sensor 28 at a timing corresponding to a substantially central position of the B field period, while simultaneously also allowing the projection processing unit 13 to measure the temperature ThB of LED 27 emitting light at this time using the temperature sensor 31 (step S111).

CPU 34 corrects the illuminance IIIlm acquired by the illuminance sensor 28 via the projection processing unit 13 based on the temperature ThB of LED 27 detected by the temperature sensor 31 also via the projection processing unit 13 to obtain the accurate illuminance of LED 27. Then, based on the illuminance obtained and the current driving current value, CPU 34 calculates an output adjusted value and specifically a driving current value for LED 27 (step S112).

Based on the calculation of the new driving current values for the light sources for the three colors as described above, CPU 34 sets, in the projection processing unit 13, the driving current values for LED 26 for red light emission, LD 18 that emits blue light in order to excite the green light, and LED 27 for blue light emission (step S113). Having completed the series of processes for correction of the color balance among the light sources, CPU 34 returns to the process starting with the above-described step S101 in order to provide for the next process for correcting the color balance.

FIGS. 6A, 6B, 6C, and 6D illustrate the concept of correction of the color balance based on the above-described process illustrated in FIG. 3.

Figure 6A:
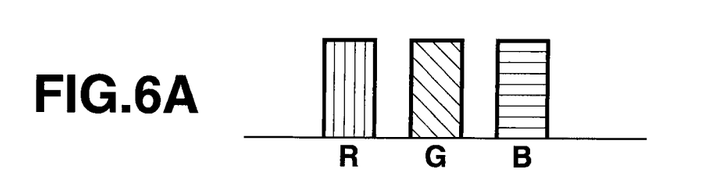
FIGS. 6A, 6B, 6C, and 6D are diagrams illustrating the concept of correction of the color balance according to the embodiment.

FIG. 6A shows the outputs of the three colors R, G, and B observed when accurate white is obtained by allowing light in these colors R, G, and B to be simultaneously emitted. As shown in FIG. 6A, the balanced outputs of the colors R, G, and B allow white color, the mixture of these colors R, G, and B to be obtained. This enables images to be projected with the correct color balance.

Figure 6B:
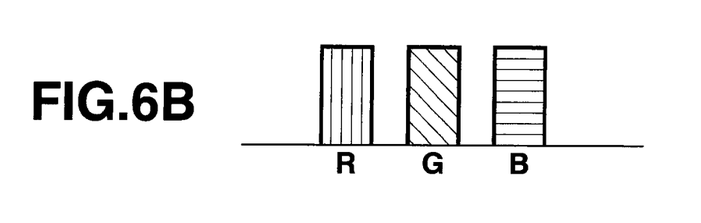

FIG. 6B, following FIG. 6A, illustrates the results of measurement of the colors R, G, and B by the illuminance sensor 28. As shown in FIG. 6B, the measurement results for the colors R, G, and B are apparently balanced, and thus the white color, that is, the mixture of these colors, appears to have the correct color temperature as previously set.

Figure 6C:
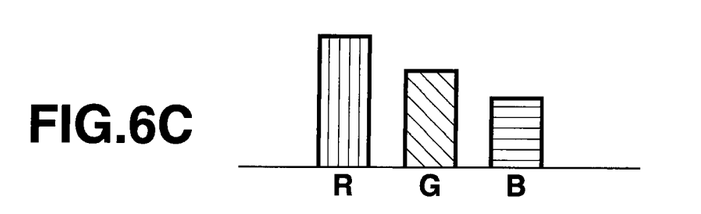

FIG. 6C shows the magnitudes of the correct illuminances resulting from the correction of the measurement results in FIG. 6B based on the detected temperature of each of the light sources. Thus, the correction based on the temperature of the semiconductor light emitting element forming each light source allows the correct illuminances of the colors to be balanced with the temperature-induced wavelength shift and the associated change in the sensitivity of the illuminance sensor 28 corrected.

Figure 6D:
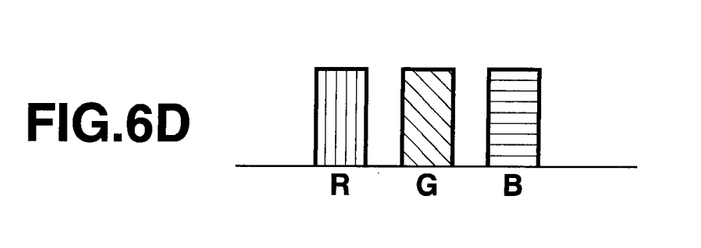

Thus, when driving current values for adjusting the respective light sources are calculated and set based on the results of the correction, the light sources for the respective colors can emit light at light emission intensities corresponding to not apparently but substantially accurate color balance, as shown in FIG. 6D.

As described above in detail, the present embodiment enables the correct tones to be maintained with the color balance prevented from being disrupted even with a change in the temperature of any of the semiconductor light emitting elements such as LD 18 and LEDs 26 and 27, which form light sources.

Furthermore, the illuminance sensor 28 is located at the position irradiated with the off light. This allows the illuminances of light delivered to the micro mirror element 14 by the light sources to be detected without affecting the optical image formed by the micro mirror element 14 and used for projection by the projection lens unit 17.

Moreover, during the series of processes for the correction of the color balance among the light sources, the micro mirror element 14 displays the entirely black image in each of the color fields for R, G, and B. This image is displayed in only one color frame and is not substantially visually perceived by the human eyes, but to prevent even a very small interruption in the projected image, measurement, detection, and the like are avoided in the W field, provided in the middle of the frame, with a luminance image displayed by the micro mirror element 14 and projected by the projection lens unit 17. As a result, a possible very small interruption in the projected image can be prevented to allow the projection operation to be continued without making the user feel uncomfortable.

In this regard, the field provided in the middle of the frame and in which ordinary image projection is carried out is not limited to the W field but may be a Y (yellow) field involving a relatively bright image. Then, the semiconductor light emitting elements that emit the red (R) light and the green (G) light, respectively, may simultaneously emit light.

Furthermore, the above-described embodiment measures the illuminance and detects the temperature of each color light source element at the timing corresponding to the center of each of the R, G, and B fields. This allows the measurement of the average illuminance for the color fields and the detection of the average light source temperature, enabling more accurate corrections.

The data projector apparatus 10 according to the present embodiment uses the rotating dichroic mirror wheels to guide light to the integrator 24. However, the data projector apparatus 10 may of course be constructed by using dichroic mirrors that are not rotatable.

Additionally, in the above-described embodiment, the red light is generated by LED 26, the green light is generated by irradiating the fluorescent wheel 21 with the light from LED 18, and the blue light is generated by LED 27. However, the present invention is not limited to this aspect. For example, of course, the light in all the colors may be generated utilizing LED or LD, or the light delivered to the fluorescent wheel 21 may be utilized to generate the green light and blue light.

Figure 7:
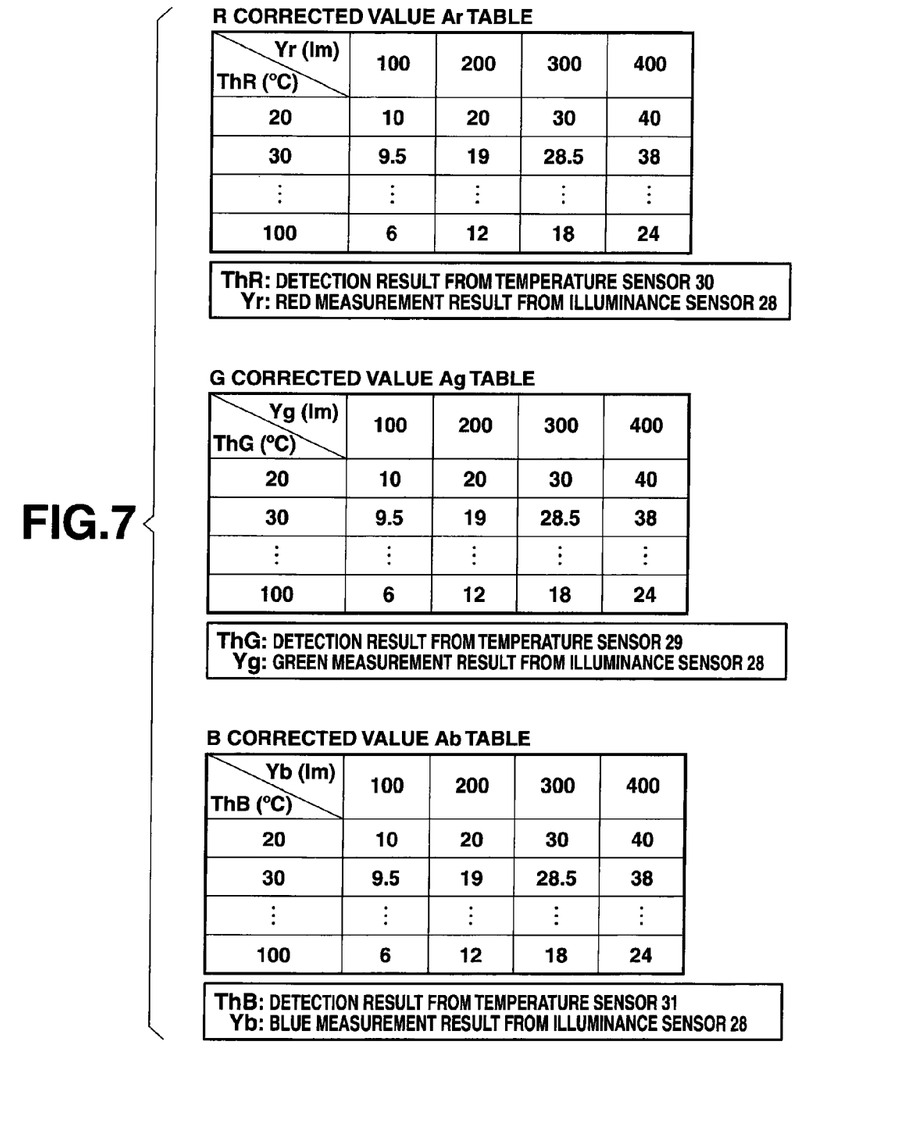
FIG. 7 is a schematic diagram of lookup tables that allow determination of correction factors for use in finding correction values based on the measured values of light source illuminances and the temperatures of the light sources.
Figure 8:
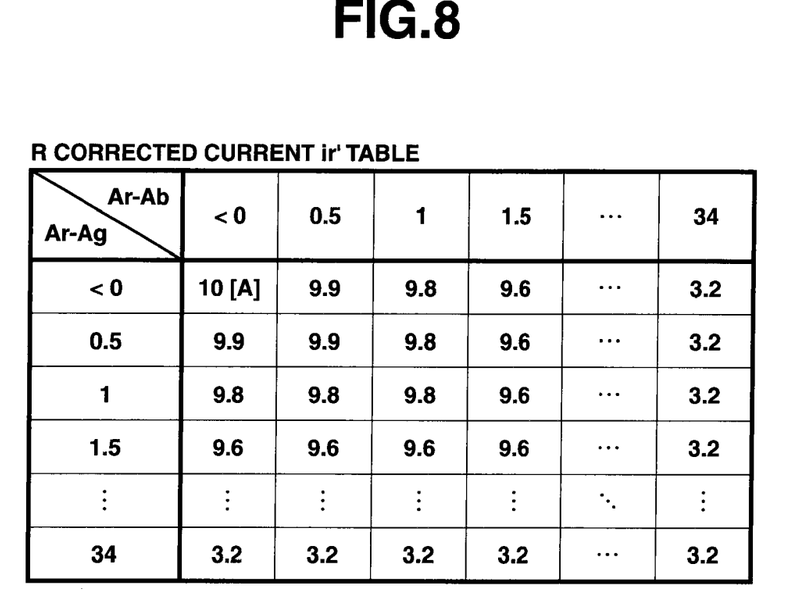
FIG. 8 is a schematic diagram of a lookup table that allows a driving current value for a red light source LED 26 to be determined based on the correction factor determined in FIG. 7.

In addition, unlike in the case of above-described embodiment, lookup tables for allowing the light source illuminance to be corrected may be pre-stored in the program memory. For example, such lookup tables as shown in FIGS. 7 and 8 are used. FIG. 7 is a schematic diagram of lookup tables that allow determination of correction factors for use in finding correction values based on the measured values of the light source illuminances and the temperatures of the light sources.

FIG. 8 is a schematic diagram of a lookup table (R corrected current ir' table) that allows a driving current value for the red light source LED 26 to be determined based on the correction factor determined in FIG. 7. In FIGS. 7 and 8, the lookup tables are simplified for description. For example, in the table of FIG. 8, the unit "[A]" for each current value is omitted except the upper left portion.

Specifically, first, the temperature of LED 26 is measured using the temperature sensor 30, and the illuminance at that measurement point of time is measured using the illuminance sensor 28. Then, a red correction factor Ar is determined using a temperature and an illuminance obtained by referencing an R corrected value Ar table, one of the lookup tables in FIG. 7. Similarly, the temperature of LD 18 is measured using the temperature sensor 29, and the illuminance at that measurement point of time is measured using the illuminance sensor 28. Then, a green correction factor Ag is determined using a temperature and an illuminance obtained by referencing a G corrected value Ag table. Similarly, the temperature of LED 27 is measured using the temperature sensor 31, and the illuminance at that measurement point of time is measured using the illuminance sensor 28. Then, a blue correction factor Ab is determined using a temperature and an illuminance obtained by referencing a B corrected value Ab table, one of the lookup tables in FIG. 7.

Then, the driving current value is determined by referencing the lookup table that allows the corrected driving current value for the light source LED 26 to be found as shown in FIG. 8. Specifically, the difference Ar−Ag between the red correction factor Ar and the green correction factor Ag obtained from the lookup tables in FIG. 7 is calculated, and the difference Ar−Ab between the red correction factor Ar and the blue correction factor Ab obtained from the lookup tables in FIG. 7 is calculated. Based on the values Ar−Ag and Ar−Ab obtained, a driving current value ir' for LED 26 is set. Similar lookup tables are stored for LD 18 and LED 27, and driving current values ig' and ib' are set. Correcting the driving current values for the light sources using these lookup tables allows the correct color tones to be maintained with the color balance prevented from being disrupted even with a change in the temperature of any of the semiconductor light emitting elements such as LD 18 and LEDs 26 and 27, which form light sources.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A projection apparatus comprising:
a plurality of different types of semiconductor light emitting elements with different light emission wavelengths;
an input unit configured to receive an input of an image signal;

an optical image formation unit which forms an optical image according to the image signal input via the input unit using source light emitted by the semiconductor light emitting elements;

a projection unit which projects the optical image formed by the optical image formation unit toward a projection target;

a temperature detection unit which detects a temperature of each type of the semiconductor light emitting elements during light emission;

a measurement unit which measures an intensity of light from each type of the semiconductor light emitting elements during light emission; and a light emission control unit configured (a) to correct a measurement result from the measurement unit using a detection result from the temperature detection unit and (b) to control the light emission intensity for each of the semiconductor light emitting elements based on the corrected measurement result;

wherein the measurement unit measures the intensity of the light using reflected light that is not reflected toward the projection unit by the optical image formation unit; and wherein the optical image formation unit (a) uses (i) a period during which a single type of the semiconductor light emitting elements emit light and (ii) a period during which a plurality of different types of the semiconductor light emitting elements simultaneously emit light, and (b) in the measurement by the measurement unit, (i) forms an entirely black optical image during the period in which the single type of the semiconductor light emitting elements emit light and (ii) forms an optical image according to the image signal input by the input unit during the period in which the plurality of different types of the semiconductor light emitting elements simultaneously emit light.

2. The projection apparatus according to claim 1, wherein the temperature detection unit detects the temperature of each type of the semiconductor light emitting elements and the measurement unit measures the light intensity, during light emission at a timing corresponding to a substantial center of each light emission period.

3. The projection apparatus according to claim 1, wherein the light emission control unit (a) carries out a predetermined arithmetic operation based on the detection result from the temperature detection unit, (b) corrects the measurement result from the measurement unit according to a calculation result from the arithmetic operation, and then (c) controls the light emission intensity of each of the semiconductor light emitting elements.

4. The projection apparatus according to claim 1, wherein the light emission control unit (a) references a predetermined lookup table and corrects the measurement result from the measurement unit based on the detection result from the temperature detection unit, and then (b) controls the light emission intensity of each of the semiconductor light emitting elements.

5. A projection method for an apparatus including a plurality of different types of semiconductor light emitting elements with different light emission wavelengths, an input unit configured to receive an input of an image signal, an optical image formation unit which forms an optical image according to the image signal input via the input unit using source light emitted by the semiconductor light emitting elements, and a projection unit which projects the optical image formed by the optical image formation unit toward a projection target, the method comprising:

detecting a temperature of each type of the semiconductor light emitting elements during light emission;

measuring an intensity of light from each type of the semiconductor light emitting elements during light emission; and correcting a measurement result in the measurement using a detection result obtained in the temperature detection and controlling the light emission intensity for each of the semiconductor light emitting elements based on the corrected measurement result;

wherein the measuring is performed using reflected light that is not reflected toward the projection unit by the optical image formation unit;

wherein the optical image formation unit uses (i) a period during which a single type of the semiconductor light emitting elements emit light and (ii) a period during which a plurality of different types of the semiconductor light emitting elements simultaneously emit light, and (b) in the measurement by the measurement unit; and wherein during the measuring the optical image formation unit is controlled to (i) form an entirely black optical image during the period in which the single type of the semiconductor light emitting elements emit light and (ii) form an optical image according to the image signal input by the input unit during the period in which the plurality of different types of the semiconductor light emitting elements simultaneously emit light.

6. A non-transitory computer-readable storage medium having a program stored thereon for controlling an apparatus including a plurality of different types of semiconductor light emitting elements with different light emission wavelengths, an input unit configured to receive an input of an image signal, an optical image formation unit which forms an optical image according to the image signal input via the input unit using source light emitted by the semiconductor light emitting elements, and a projection unit which projects the optical image formed by the optical image formation unit toward a projection target, the program controlling the apparatus to carry out functions comprising:

detecting a temperature of each type of the semiconductor light emitting elements during light emission;

measuring an intensity of light from each type of the semiconductor light emitting elements during light emission; and correcting a measurement result in the measurement using a detection result obtained in the temperature detection and controlling the light emission intensity for each of the semiconductor light emitting elements based on the corrected measurement result;

wherein the measuring is performed using reflected light that is not reflected toward the projection unit by the optical image formation unit;

wherein the optical image formation unit uses (i) a period during which a single type of the semiconductor light emitting elements emit light and (ii) a period during which a plurality of different types of the semiconductor light emitting elements simultaneously emit light, and (b) in the measurement by the measurement unit; and wherein during the measuring the optical image formation unit is controlled to (i) form an entirely black optical image during the period in which the single type of the semiconductor light emitting elements emit light and (ii) form an optical image according to the image signal input by the input unit during the period in which the plurality of different types of the semiconductor light emitting elements simultaneously emit light.

7. A projection apparatus comprising:
a plurality of different types of semiconductor light emitting elements with different light emission wavelengths;
an input unit configured to receive an input of an image signal;
an optical image formation unit which forms an optical image according to the image signal input via the input unit using source light emitted by the semiconductor light emitting elements;
a projection unit which projects the optical image formed by the optical image formation unit toward a projection target;
a temperature detection unit which detects a temperature of each type of the semiconductor light emitting elements during light emission;
a measurement unit which measures an intensity of light from each type of the semiconductor light emitting elements during light emission; and
a light emission control unit configured (a) to correct a measurement result from the measurement unit using a detection result from the temperature detection unit and (b) to control the light emission intensity for each of the semiconductor light emitting elements based on the corrected measurement result;
wherein the temperature detection unit detects the temperature of each type of the semiconductor light emitting elements and the measurement unit measures the light intensity, during light emission at a timing corresponding to a substantial center of each light emission period.

* * * * *